US005762994A

United States Patent [19]
Juillerat et al.

[11] Patent Number: 5,762,994
[45] Date of Patent: Jun. 9, 1998

[54] OBTENTION OF PROTEIN AND LIPID COMPOSITIONS FROM FRUIT KERNELS

[75] Inventors: Marcel Alexandre Juillerat, Fondettes, France; Joel Perrinjaquet, New Milford, Conn.

[73] Assignee: Nestec S.A., Vevey, Switzerland

[21] Appl. No.: 678,522

[22] Filed: Jul. 9, 1996

[30] Foreign Application Priority Data

Jul. 10, 1995 [EP] European Pat. Off. ............. 95810453

[51] Int. Cl.⁶ ..................................................... A23L 1/064
[52] U.S. Cl. ........................ 426/655; 426/431; 426/479; 426/489; 426/601; 426/656
[58] Field of Search ...................... 426/655, 478, 426/479, 489, 431, 601, 602, 656

[56] References Cited

U.S. PATENT DOCUMENTS 2,941,888   6/1960   Dolman .
4,309,696   1/1982   Marguardt et al. .

FOREIGN PATENT DOCUMENTS 992939   7/1951   France .
55982   6/1952   France .
2019262  11/1970  Germany .

OTHER PUBLICATIONS

Database Abstract. Subfile FSTA. for Annals of Agricultural Science. 1986, Authors: Salem et al.

Database Abstract. Subfile: Prompt for Cosmetics & Toiletries Manufacturers & Suppliers. Mar. 1994. No Author given.

Derwent Database Abstract, Acc. No. C70–R78576, abstract of Baudot, German Patent No. 2 019 262 (1970).

Primary Examiner—Anthony J. Weier
Attorney, Agent, or Firm—Vogt & O'Donnell, LLP

[57] ABSTRACT

Protein and lipid compositions are obtained from fruit kernels, particularly stone fruit kernels, by grinding the kernels in water to obtain ground kernel matter in an aqueous dispersion and extracting the aqueously dispersed matter to obtain an aqueous medium containing protein and lipid extracts and insoluble material, and then, the insoluble material is separated from the aqueous extract-containing medium, a fraction of protein and lipid substances are isolated from the extract-containing medium, and then, the fraction is homogenized and sterilized.

20 Claims, No Drawings

OBTENTION OF PROTEIN AND LIPID COMPOSITIONS FROM FRUIT KERNELS

BACKGROUND OF THE INVENTION

The subject of the present invention is a process for the production of milk from fruit kernels and its use for the production of a food product.

SUMMARY OF THE INVENTION

The aim of the present invention is to propose a process for the production of milk from fruit kernels which can be used in the food sector, especially milk from fruit kernels of high thermal stability and having good self-emulsifying properties which allow the reconstitution of fine and stable emulsions.

To this end, in the process for the production of milk from fruit kernels according to the present invention:

fruit kernels are ground in water in order to obtain an aqueous dispersion of ground kernel matter, an aqueous extraction is performed on the ground kernel matter dispersion, the insoluble matter of the aqueous extract is separated, a protein and/or lipid rich fraction is isolated from the aqueous extract-containing medium, the said fraction is homogenized and it is sterilized.

DETAILED DESCRIPTION OF THE INVENTION

To carry out the present process, the said kernels may be chosen from the kernels of stone fruits such as peaches and apricots for example.

The said kernels may be ground, preferably after removing the skin and crushing in the dry state, in water at room or moderately high temperature, especially at 10°–35° C., in a suitable weight ratio, especially a ratio of 1/12 to 1/3 for example, to obtain ground kernel matter in the water. To do this, a mill, a grinder or a high-speed stirrer such as a POLYTRON type apparatus may be used for example. Preferably, two successive grindings are carried out so as to obtain a particularly fine aqueous dispersion of the ground matter.

The said aqueous extraction may be carried out at a pH greater or less than the isoelectric pH of the proteins of the said kernels, at room or moderately high temperature, for a time sufficient to allow the dissolution of most of the soluble matter of the said kernels, especially for one or more hours.

The insoluble matter may be separated by centrifugation, decantation, draining or filtration for example.

The said protein and/or lipid rich fraction may be isolated by isoelectric precipitation, namely at a pH equal to or close to the isoelectric pH of the proteins of the said kernels, or by tangential filtration, ultrafiltration and/or microfiltration. In the first case, the sugar rich supernatant may be separated by centrifugation, tangential filtration, ultrafiltration and/or microfiltration, and in the second case, the filtrate or the permeate may be directly separated for example.

In a first preferred embodiment of the present process, sweet apricot kernels are used. In this case, the said extraction is carried out preferably at pH 5–11 at 10°–50° C. for 1–5 h, the insoluble matter is separated from the aqueous extract, the protein and/or lipid rich fraction is isolated by precipitation at pH 3–5 at 10°–50° C. and the supernatant is separated.

In a second preferred embodiment of the present process, bitter apricot kernels are used. In this case, the said extraction is carried out preferably at pH 5–11 at 10°–45° C. for 1 to 10 h, hydrocyanic acid is separated from the aqueous extract by steam distillation or by distillation, the insoluble matter is separated by centrifugation, the protein and/or lipid rich fraction is isolated by tangential filtration, filtration and/or microfiltration, and the filtrate is separated.

The said aqueous extract or the said protein and lipid rich fraction may be skimmed for example. The skimming may be carried out at 4°–60° C., preferably at 35°–45° C. for example. This skimming may be performed with the aid of a centrifuge or a cream separator for example. Following such a skimming, the aqueous extract or the protein rich fraction and the cream may be stored at 1°–5° C. up to their use, for example.

In order to stabilize it by reducing the size of the lipid particles which it contains, the said protein and/or lipid rich fraction may be homogenized in a homogenizer, especially a piston homogenizer as manufactured by the company Rannie or the company Manton-Gaulin, in one or more passes at 50–1000 bar at 45°–85° C., preferably at 200–350 bar at 45°–65° C., for example.

In order to remove the bacterial load and to allow good storage in view of its use, especially in the food sector, the said protein and lipid rich fraction may be sterilized by heating at 80°–160° C. for 5 s to 60 min, preferably at 130°–150° C. for 20–80 s, for example.

Preferably, the said fraction is dried, after sterilization, to a residual water content of 1–7%. This drying may be carried out in a spray-drying tower, by freeze-drying or on a roller drier for example.

To facilitate the drying, in other words in order to be able to dry the said fraction without having to fear a separation of its lipid and protein phases, a drying aid may be added to it before homogenizing it, in an amount of 5–50%, preferably 10–30% by weight relative to the dry matter content of the fraction. A hydrocolloid such as xanthan gum or maltodextrin, for example, may be used as a drying aid.

It has been observed, surprisingly, that a protein and/or lipid rich fraction is thus obtained, in a dried form, having good self-emulsifying properties during its reconstitution.

The subject of the present invention is therefore also the use of all or part of a milk obtained by the present process for the production of a food product, especially for the production of products such as ice creams, dessert creams, coffee creams, mayonnaise sauces, salad dressings, flans, puddings or blancmanges for example.

The subject of the present invention is finally also a process for reconstituting a fraction enriched in lipid and/or protein of the said fruit kernels having a lipid/protein weight ratio of 0.05–3.5, by mixing a protein and/or lipid rich fraction isolated from the said aqueous extract with a cream obtained by skimming the said aqueous extract or the said protein and lipid rich fraction.

The process for the production of milk from fruit kernels, the use of this milk for the production of food products and the reconstitution of a lipid enriched fraction according to the present invention are described in greater detail in the nonlimiting examples below.

EXAMPLES

In these Examples below, the percentages and parts are given by weight, unless otherwise indicated, and the pH adjustments are made by adding 5N HCl or 5N NaOH.

Example 1

50 kg of skin-free sweet apricot kernels having a dry matter content of 96%, a protein content of 27.5% (13.2 kg) and a lipid content of 52% (25 kg) are crushed in the dry state.

These kernels are ground in 400 kg of water at 25° C. in a POLYTRON high-speed stirrer. The aqueous dispersion thus obtained is pumped directly into a colloid mill where it is subjected to a second grinding so as to obtain a particularly fine aqueous dispersion.

This dispersion is subjected to an aqueous extraction at pH 7 at 25° C. for 2 h.

The insoluble matter is separated from the aqueous extract by centrifugation at 25° C. for 3 h.

360 kg of aqueous extract are recovered having a dry matter content of 8.9% and containing 72.4% of the proteins and 74.2% of the lipids of the starting skin-free sweet apricot kernels.

From 65 kg of this aqueous extract a protein and lipid rich fraction is isolated by precipitation at pH 4 at 25° C. and the sugar rich supernatant is separated by centrifugation at 25° C.

19.6 kg of a fraction are thus recovered having a dry matter content of 11.9% and containing 57.1% of the proteins and 38% of the lipids contained in the 65 kg of aqueous extract.

The dry matter content of this fraction is adjusted to 10% by addition of water and its pH is adjusted to 7.

Xanthan gum is added a drying aid to 11.3 kg of the dilute fraction, in an amount of 5% by weight relative to the dry matter content of the fraction.

The dilute fraction is homogenized at 50° C. in a RANNIE homogenizer in two successive passes, the first at 250 bar and the second at 50 bar. The homogenized fraction thus obtained has an unctuous texture.

The homogenized fraction is sterilized by heating at 140° C. for 40 s.

The sterilized fraction is dried in a NIRO spray drier, with a spray-drying rate of 22,000 rpm, an air inlet temperature of 170° C. and a product outlet temperature of 80° C.

A powdered milk is thus obtained from sweet apricot kernels which has a residual water content of 2.2% and a lipid/protein weight ratio of 1.31.

Example 2

The procedure is carried out as described in Example 1, except for the fact that maltodextrin instead of xanthan gum is added a drying aid to the dilute fraction in an amount of 20% relative to the dry matter content of the fraction.

A powdered milk is thus obtained from sweet apricot kernels which has a residual water content of 2.3% and a lipid/protein weight ratio of 1.31.

Example 3

The procedure is carried out as described in Example 1 until the aqueous extract is obtained from which the insoluble matter has been separated.

260 kg of protein and lipid rich aqueous extract are recovered having a dry matter content of 8.9% and containing 72.4% of the proteins and 74.2% of the lipids of the starting skin-free sweet apricot kernels.

The 260 kg of protein and lipid rich aqueous extract are skimmed with the aid of a centrifuge at 40° C.

On the one hand, 21.8 kg of cream are recovered containing 6.2% of the proteins and 95% of the lipids contained in the 260 kg of protein and lipid rich aqueous extract, which represents 1.5% of the proteins and 48.2% of the lipids of the starting skin-free sweet kernels.

The dry matter content of this cream is adjusted to 50.5% by addition of water and it is stored at 4° C. for subsequent use.

On the other hand, 227 kg of protein rich aqueous extract are recovered having a dry matter content of 3.7% and containing 81.9% of the proteins and 1.4% of the lipids contained in the 260 kg of protein and lipid rich aqueous extract.

From 160 kg of this protein rich aqueous extract, a protein rich fraction is isolated by precipitation at pH 4 at 25° C. and the sugar rich supernatant is separated by centrifugation at 25° C.

The protein rich fraction thus obtained has a dry matter content of 12.5% and contains 86.4% of the proteins contained in the 160 kg of protein rich aqueous extract.

The dry matter content of this fraction is adjusted to 10% by addition of water and its pH is adjusted to 7.

Xanthan gum is added a drying aid to 10.6 kg of the dilute fraction, in an amount of 20% relative to the dry matter content of the fraction.

The dilute fraction is homogenized at 50° C. in a Rannie type homogenizer in two successive passes, the first at 250 bar and the second at 50 bar. The homogenized fraction thus obtained has an unctuous texture.

The homogenized fraction is sterilized by heating at 140° C. for 40 s.

The sterilized fraction is dried in a Niro spray-drier, with a spray-drying rate of 22,000 rpm, an air inlet temperature of 170° C. and a product outlet temperature of 80° C.

A powdered skimmed milk is thus obtained from sweet apricot kernels which has a residual water content of 6.6% and a lipid/protein weight ratio of 0.09.

Example 4

A fraction enriched in lipid and protein of skin-free sweet apricot kernels is reconstituted from the cream obtained in Example 3 and from the protein rich fraction as obtained in Example 3 before homogenization.

To this end, 1.1 kg of cream are mixed with 12 kg of protein rich fraction.

Xanthan gum is added a drying aid to the 13.1 kg of the fraction thus reconstituted, in an amount of 5% relative to the dry matter content of the fraction.

The reconstituted fraction is homogenized at 50° C. in a RANNIE type homogenizer in two successive passes, the first at 250 bar and the second at 50 bar.

The homogenized reconstituted fraction is sterilized by heating at 140° C. for 40 s.

The sterilized reconstituted fraction is dried in a NIRO spray-drier, with a spray-drying rate of 22,000 rpm, an air inlet temperature of 170° C. and a product outlet temperature of 80° C.

A powdered reconstituted milk is thus obtained from sweet apricot kernels which has a residual water content of 4.5% and a lipid/protein weight ratio of 0.54.

Example 5

A Fraction enriched in lipid and protein of sweet apricot kernels is reconstituted from a protein and lipid rich fraction as obtained in Example 1 before homogenization and from a cream as obtained in Example 3, in order to produce milk from sweet apricot kernels which has a desired lipid/protein weight ratio.

To this end, 3.9 kg of the said cream are mixed with 6.9 kg of the said protein and lipid rich fraction.

Xanthan gum is added a drying aid to the 10.8 kg of the fraction thus reconstituted, in an amount of 5% relative to the dry matter content of the fraction.

The reconstituted fraction is homogenized at 50° C. in a RANNIE type homogenizer in two successive passes, the first at 250 bar and the second at 50 bar.

The homogenized reconstituted fraction is sterilized by heating at 140° C. for 40 s.

The sterilized reconstituted fraction is dried in a NIRO spray-drier, with a spray-drying rate of 22,000 rpm, an air inlet temperature of 170° C. and a product outlet temperature of 80° C.

A powdered reconstituted milk is thus obtained from sweet apricot kernels which has a residual water content of 1.9% and a lipid/protein weight ratio of 2.66.

Example 6

50 kg of skin-free bitter apricot kernels having a dry matter content of 96%, a protein content of 26% (12.5 kg) and a lipid content of 47% (22.6 kg) are crushed in the dry state.

These kernels are ground in 180 kg of water at 25° C. in a POLYTRON high-speed stirrer. The aqueous dispersion thus obtained is pumped directly into a colloid mill where it is subjected to a second grinding so as to obtain a particularly fine aqueous dispersion.

This dispersion is subjected to an aqueous extraction at pH 6 at 40° C. for 6 h.

Hydrocyanic acid is separated from the aqueous extract by steam distillation and then the insoluble matter is separated by centrifugation at 25° C. for 3 h.

An aqueous extract is recovered having a dry matter content of 8.6% and containing 67.2% of the proteins and 73.7% of the lipids of the starting skin-free bitter apricot kernels.

From this aqueous extract, a protein and lipid rich fraction is isolated by ultrafiltration at 50° C. and the sugar and cyanide residue rich filtrate is separated. 49.8 kg of a fraction are thus recovered having a dry matter content of 37.3% and containing 24.9% of the proteins and 98.9% of the lipids contained in the 360.3 kg of aqueous extract.

This protein and lipid rich fraction is skimmed at 40° C. with the aid of a centrifuge.

On the one hand, 35.7 kg of cream are recovered, having a dry matter content of 46.3% and containing 63.9% of the proteins and 93.8% of the lipids contained in the protein and lipid rich fraction.

On the other hand, 12.1 kg of protein rich fraction are recovered having a dry matter content of 5% and containing 23.9% of the proteins and 0.4% of the lipids contained in the protein and lipid rich fraction.

To produce a milk from bitter apricot kernels which has a desired lipid/protein weight ratio, a fraction enriched in lipid and protein of bitter apricot kernels is reconstituted by mixing 11.5 kg of the protein rich fraction with 1.8 kg of the cream obtained in the present example.

Xanthan gum is added a drying aid to the 13.3 kg of the fraction thus reconstituted, in an amount of 10% relative to the dry matter content of the fraction.

The reconstituted fraction is homogenized at 50° C. in a RANNIE type homogenizer in two successive passes, the first at 250 bar and the second at 50 bar. The homogenized reconstituted fraction thus obtained has an unctuous texture.

The homogenized reconstituted fraction is sterilized by heating at 140° C. for 40 s.

The sterilized reconstituted fraction is dried in a Niro spray-drier, with a spray-drying rate of 22,000 rpm, an air inlet temperature of 170° C. and a product outlet temperature of 80° C.

A powdered reconstituted milk is thus obtained from bitter apricot kernels which has a residual water content of 4.5% and a lipid/protein weight ratio of 1.41.

Example 7

The sweet apricot kernel cream as obtained in Example 3 is used for the production of an ice cream.

To do this, 100 g of powdered milk, 150 g of sucrose and 30 g of glucose syrup are dissolved in 630 g of water at 65° C.

4 g of vanilla flavour and a molten mixture comprising 10 g of previously homogenized and sterilized sweet apricot kernel cream and 80 g of BISCOCREME vegetable cream are added thereto.

This preparation is homogenized in a RANNIE type homogenizer in two successive passes, the first at 140 bar and the second at 40 bar.

The homogenized preparation is pasteurized at 83° C. for 30 s in a plate exchanger.

The pasteurized preparation is cooled to 4° C. and it is allowed to stand for 12 h at this temperature before carrying out the freezing in a HOYER MF50 type freezer.

An ice cream having a foamy texture is thus obtained.

This ice cream is then hardened in a pulsed air cooling cell and it is stored at −35° C.

After tempering at −18° C., this ice cream has both a vanilla-, almond- and pistachio-like taste, as well as a texture which is smooth, slippery and not very greasy.

Example 8

The sweet apricot kernel cream as obtained in Example 3 is used for the production of oven-baked flans.

To do this, 375 g of fresh skimmed milk containing 3.2% protein, 71 g of coconut milk containing 71% lipid and 6% protein, and 30 g of powdered milk containing 32.8% protein and 130 g of sugar are mixed at 60° C. in a high-speed stirrer.

The mixture is cooled to 25° C.

Then, while stirring, 51 g of previously homogenized and sterilized sweet apricot kernel cream are incorporated into the mixture. 150 g of beaten eggs are added to this preparation.

The flans thus prepared on a water bath are baked in an oven at 175° C. for 45 min.

These baked flans have a firm, smooth and creamy texture as well as a coconut taste.

Example 9

The sweet apricot kernel cream as obtained in Example 3 is used for the production of oven-baked flans.

To do this, 400 g of fresh skimmed milk containing 3.2% protein, 38 g of powdered milk containing 32.8% protein and 130 g of sugar are mixed at 60° C. in a high-speed stirrer.

The mixture is cooled to 25° C.

Then, while stirring, 70 g of creme fraiche containing 35% fat and 103 g of previously homogenized and sterilized sweet apricot kernel cream are incorporated into the mixture.

150 g of beaten eggs are added to this preparation.

The flans thus prepared on the water bath are baked in an oven at 175° C. for 45 min.

These baked flans have a firm, smooth and creamy texture, as well as an apricot kernel taste.

Example 10

The sweet apricot kernel cream as obtained in Example 3 is used for the production of oven-baked flans made solely from plant material and from eggs.

To do this, 416 g of water, 30.6 g of plant protein concentrate containing 80% protein, and 130 g OF sugar are mixed at 60° C. in a high-speed stirrer.

The mixture is cooled to 25° C.

Then, while stirring, 154 g of previously homogenized and sterilized sweet apricot kernel cream are incorporated into the mixture. 150 g of beaten eggs are added to the whole mixture.

The flans thus prepared on the water bath are baked in an oven at 175° C. for 45 min.

These baked flans have a firm, smooth and creamy texture, as well as an apricot kernel taste.

Example 11

The sweet apricot kernel cream as obtained in Example 3 is used for the production of a mayonnaise sauce.

To do this, 15 kg of this cream, previously homogenized and sterilized, are heated to 45° C. and 100 g of "Annatto" butter are added thereto as colouring.

In parallel, 67 kg of demineralized water are mixed successively with 730 g of salt, 4 kg of starch, 3 kg of lactic proteins, 120 g of xanthan gum, 630 g of sugar, 500 g of lemon, 5.5 kg of mustard, 550 g of Fondor MAGGI, 50 g of pepper, 50 g of TABASCO flavouring, 20 g of liquid MAGGI flavour and 150 g of turmeric. The pH of the mixture is adjusted to 4.

The mixture is then homogenized while incorporating therein the fat, previously melted, so as to obtain an emulsion.

40 g of egg flavour are added to the emulsion, the mayonnaise thus obtained is pasteurized and it is packaged hot.

This mayonnaise has an unctuous texture and a nut oil taste.

Example 12

The sweet apricot kernel cream as obtained in Example 3, and then homogenized and sterilized, is used for the production of a powdered cream which can be used for the production of various culinary dishes.

To do this, 10 kg of water, 2 g of salt, 6 g of sodium caseinate, 2 g of powdered skimmed milk and 38 g of lactose are mixed and the mixture is heated to 65° C.

Then the mixture is homogenized while incorporating therein 50 g of sweet apricot kernel cream previously heated to 65° C., so as to obtain an emulsion.

The emulsion is pasteurized at 95° C. for 5 s and it is cooled to 30° C.

The emulsion is then dried in a NIRO type spray-drier at 175° C. and then at 75° C. so as to obtain a powdered cream.

The powder thus obtained can be used in the preparation of a pudding, a dessert cream, a coffee cream, blancmanges or salad dressings for example.

We claim:

1. A process for obtaining protein and lipid compositions comprising:

grinding stone fruit kernels in water to obtain an aqueous dispersion comprising ground kernel matter and extracting the aqueously dispersed ground kernel matter to obtain an aqueous medium comprising protein and lipid extracts and insoluble material;

separating the insoluble material from the aqueous medium to obtain a protein and lipid extract-containing medium;

isolating from the extract-containing medium a fraction comprising protein and lipid substances;

homogenizing the fraction to obtain a homogenate; and sterilizing the homogenate to obtain a sterilized homogenate.

2. A process according to claim 1 wherein the kernels are selected from the group consisting of apricot kernels and peach kernels.

3. A process according to claim 1 wherein the kernels are apricot kernels.

4. A process according to claim 1 or 3 wherein the kernels are ground in the water at a temperature of from 10° C. to 35° C. in ratio by weight of kernels to water of from 1:12 to 1:3.

5. A process according to claim 4 wherein the kernels are kernels from which kernel skin has been removed.

6. A process according to claim 3 wherein the kernels are sweet kernels and the ground kernel matter is extracted at a pH of from 5 to 11 at a temperature of from 10° C. to 50° C. for from 1 hour to 5 hours and wherein for isolating the fraction, the fraction is precipitated from the extract-containing medium at a pH of from 3 to 5 at a temperature or from 10° C. to 50° C. to obtain a fraction precipitate and a supernatant and wherein the supernatant is separated from the fraction precipitate to isolate the fraction.

7. A process according to claim 6 wherein for precipitating of the fraction, the pH of the extract-containing medium is approximately an isoelectric pH of the protein.

8. A process according to claim 3 wherein the kernels are bitter kernels and the ground kernel matter is extracted at a pH of from 5 to 11 at a temperature of from 10° C. to 45° C. for from 1 hour to 10 hours and further comprising, prior to separating the insoluble material from the aqueous medium, distilling the aqueous extract to remove hydrocyanic acid from the aqueous medium and wherein for isolating the fraction, the extract-containing medium is filtered by a method selected from the group consisting of tangential filtration, ultrafiltration, microfiltration and combinations thereof to isolate a filtrate which comprises the fraction.

9. A process according to claim 8 wherein the distilling is steam distilling.

10. A process according to claim 1 or 6 or 8 further comprising, prior to isolating the fraction, skimming lipids from the extract-containing medium to obtain a cream separated from the extract-containing medium.

11. A process according to claim 10 further comprising, prior to homogenizing the fraction, mixing an amount of the cream with the fraction.

12. A process according to claim 1 or 6 or 8 further comprising, prior to homogenizing the fraction, skimming lipids from the fraction to obtain a cream separated from the fraction.

13. A process according to claim 12 further comprising, prior to homogenizing the fraction, mixing an amount of the cream with the fraction.

14. A process according to claim 1 further comprising grinding further stone fruit kernels in water to obtain a second aqueous dispersion comprising ground kernel matter and extracting the second aqueously dispersed ground kernel matter to obtain a second aqueous medium comprising further protein and lipid extracts and further insoluble materials separating the further insoluble material from the second aqueous medium to obtain a second protein and lipid extract-containing medium, skimming lipids from the second extract-containing medium to obtain a cream separated from the second extract-containing medium and prior to homogenizing the fraction, mixing an amount of the cream with the fraction.

15. A process according to claim 1 further comprising grinding further stone fruit kernels in water to obtain a second aqueous dispersion comprising ground kernel matter and extracting the second aqueously dispersed ground kernel matter to obtain a second aqueous medium comprising further protein and lipid extracts and insoluble material, separating the further insoluble material from the second aqueous medium to obtain a second protein and lipid extract-containing medium, isolating from the second extract-containing medium a second fraction comprising protein and lipid substances, skimming lipids from one of the two fractions to obtain a cream separated from one of the two fractions, mixing an amount of the cream with the fraction not skimmed for obtaining the fraction to be homogenized and then homogenizing the fraction.

16. A process according to claim 1 wherein the fraction is homogenized at a pressure of from 50 bar to 1,000 bar at a temperature of from 45° C. to 85° C.

17. A process according to claim 1 wherein the homogenate is sterilized at a temperature of from 130° C. to 160° C. for from 20 seconds to 80 seconds.

18. A process according to claim 1 further comprising combining the sterilized homogenate with a drying aid so that the drying aid is in an amount by weight, based upon the sterilized homogenate dry weight, of from 5% to 50% to obtain a mixture and drying the mixture to a moisture content of from 1% to 7%.

19. A process according to claim 18 wherein the drying aid is maltodextrin.

20. A process according to claim 18 wherein the drying aid is xanthan.

\* \* \* \* \*